United States Patent Office 3,427,168
Patented Feb. 11, 1969

3,427,168
METHOD OF PRODUCING TUBULAR
SAUSAGE CASINGS
Albin F. Turbak and Henry J. Rose, Danville, Ill., assignors to Tee-Pak, Inc., Chicago, Ill., a corporation of Illinois
No Drawing. Filed Dec. 29, 1965, Ser. No. 517,455
U.S. Cl. 99—176     2 Claims
Int. Cl. A22c *13/00*

ABSTRACT OF THE DISCLOSURE

A cellulosic sausage casing having a color approximating that of natural gut and adherent toward dry sausage compositions during the processing of dry sausages therein is prepared by incorporating soluble protein, such as gelatin, and whole blood or blood fractions, containing a small amount of hydrogen peroxide, in the viscose from which the casing was prepared. Separate solutions are prepared of soluble protein in water and of whole blood in water containing about 0.1–0.5% hydrogen peroxide. These solutions are mixed and added to viscose immediately prior to extrusion thereof in an amount sufficient to produce a concentration of 0.5–5% protein and 0.1–10% blood or blood fractions in the extruded casing to color the casing and provide properties of adhesion toward dry sausage meat when processed therein.

---

This invention relates to new and useful improvements in sausage casings and to improvements in the manufacture of dry sausages.

Dry sausage, of which the various salami and cervelats are prime examples, is conventionally processed by drying rather than by cooking, hence the name. Dry sausage is ordinarily served cold, without further cooking by the housewife.

The manufacture of dry sausage customarily involves mixing desired proportions of fat and lean meats, beef or pork, with selected spices, seasonings and curing materials to form an emulsion which is initially cured at a few degrees above freezing (36° to 38° F.), for two or three days depending upon the size of the meat particles so that they will be preserved sufficiently to be smoked and dried.

The chill cured meat emulsion is then firmly packed into casings of suitable size and shape, and the ends of the casing are tied ready for delivery to the drying room or smokehouse, depending upon the type of sausage. The stuffed dry sausage is smoked and then dried, while unsmoked dry sausage is dried only. The drying or curing time will vary with the particular type of sausage being processed and to some extent with the processing conditions. However, 60 to 90 days is usually considered a minimum time and periods of 120 to 180 days or more are used under some circumstances.

The processing of dry sausage is described fully in "Sausage and Ready-to-Serve Meats," published by the American Institute. The term "dry sausage" as used herein includes the entire range of dry and semi-dry sausages. The semi-dry sausages include the thuringer cervelats which are dried for about 10 days (other semi-dry sausages may be dried as short a time as 2 to 6 days). Dry sausage is usually sold in three different forms; first, new sausage or semi-dry sausage, about 10 to 25 days after smoking (having about 20% shrinkage); second, medium dry sausage, about 30 to 60 days after smoking (having about 32% shrinkage); and dry sausage, about 60 to 90 days or more after smoking (having about 40% shrinkage).

Previously, the sausage meat emulsions were stuffed into casings formed of natural materials or animal products such as sewn beef middles and hog casings. More recently, considerable interest has been developed in utilizing certain synthetic materials out of which casings could be formed. Particularly, the industry has turned to the use of casings formed of regenerated cellulose per se or of the product known in the art as fibrous casing and which is composed of cellulosic fibers impregnated and held together by regenerated cellulose.

The use of such synthetic materials is not only desirable because of the greater control over the supply that can be exercised in keeping with the rapid growth and demand of the various packaged and/or cased meat products, but also the materials can be conventionally synchronized and extruded into seamless tubular form of preselected diameter. Most importantly, casings formed of the aforesaid fibrous material, unlike the natural product can be made sufficiently flexible as well as durable to be advantageously used in the stuffing step, while also being sufficiently nonelastic that they will not stretch out of shaped during or subsequent to stuffing, but will retain a more constant shape and size corresponding to that to which it was initially designed.

This, of course, permits a definite relation to be established between the number of slices of the sausage and weight which may be assembled as a unit, and is obviously a highly desirable characteristic in the mechanical high speed packaging methods employed today. In addition, the cellulosic casings are much more sanitary than natural casings, and are more economical to use where they do not require tying with strings to maintain their shape.

However, one of the essential drawbacks of such cellulosic materials is their lack of ability to shrink with the sausage during the drying of the sausage emulsion. In the preparation of dry sausages, the sausage tends to shrink away from the cellulosic casing and leave gaps between the meat and the casing in which there is a tendency for mold and/or so called "brown ring" to develop. This trouble is not encountered where natural casings are used since natural casings tend to expand and contract with the sausage during curing.

Another problem which is encountered in the use of synthetic sausage casings in the preparation of dry sausages is related to the color of the casings. The is a considerable demand for a casing which is colored substantially the same as natural gut casing. The matching of casing colors with natural gut has proved quite difficult, particularly in view of the small number of approved dyes available for use in packaging material used for meats or other foods.

The problem of producing synthetic casings which adhere satisfactorily to dry sausages during preparation thereof has been at least partially solved by the application of certain coatings, such as casein, collagen, gelatin, and the like, to the interior of such casings. These coatings have been applied by introduction into the casing in the form of a slug or bubble of a coating solution which coats the interior of the casing as the casing is moved past the slug or bubble. This method of interior coating of casings is objectionable in that there is no control over the uniformity of the coating which is applied and it is difficult to determine when the slug or bubble of coating liquid is exhausted and a new one is required.

It is therefore one object of this invention to provide an improved artificial sausage casing which adheres to a dry sausage and follows the shrinkage thereof during curing.

A further object of this invention is to provide a new and improved method of preparing artificial sausage casings to cause the same to adhere to meat encased therein to follow the shrinkage of the meat during curing.

A further object of this invention is to provide an improved method of preparing an artificial casing for dry sausages having a coloring which approximates that of natural gut casing.

A feature of this invention is the provision of an artificial sausage casing of tubular shape having gelatin dispersed throughout the wall of the casing, whereby the casing adheres to the surface of sausage meat processed therein.

Another feature of this invention is the provision of a process for manufacture of sausage casings in which the casing is provided with gelatin dispersed throughout the wall of the casing and has whole blood or the color bodies and/or proteins from whole blood dispersed therein to provide a color in the casing approximating that of natural gut casing, as well as improved adhesion to dry sausage and improved peelability from moist sausages.

Other objects and features of this invention will become apparent from time to time throughout the specification and claims as hereinafter related.

SUMMARY OF THE INVENTION

In recent years, regenerated cellulose casings, both fibrous and ninfibrous types, have been made and sold commercially for use in the manufacture of dry sausages. These casings have been coated on their inner surfaces with a thin layer of gelatin which is effective in causing the casing to adhere to a dry sausage emulsion and follow the shrinkage of the sausage during curing. Gelatin-coated regenerated cellulose casings of this type, however, are subject to the disadvantage that they must be soaked in water prior to use and this soaking generally results in a very substantial loss of the gelatin coating. As a result there has been a substantial failure of adhesion of casings to dry sausages during processing which has resulted in the production of unsatisfactory sausage products. The loss of gelatin during the soaking step can be offset to some extent by application of a heavier gelatin coating or by fixing the gelatin in place by reaction with a gelatin hardening agent or by application of heat. The application of gelatin as an inner coating to the casing, however, has been subject to the further difficulties encountered in the application of any interior coating to a hollow tubing or casing.

This invention is based upon the discovery that regenerated cellulose casings, both of the fibrous and nonfibrous type, can be rendered adherent to dry sausage meats by incorporation of soluble protein, such as gelatin and whole blood (or the color forming ingredients of whole blood) into the viscose from which the casings are prepared. Gelatin is normally degraded rapidly by contact with concentrated alkali. However, we have found that gelatin can be incorporated into viscose just prior to its extrusion into an acid coagulation and regeneration bath without undue degradation of the gelatin. It has also been found that the incorporation of whole blood (or the color forming protein bodies or plasma present in whole blood) into the viscose along with the gelatin results in the formation of a regenerated cellulose casing, either with or without paper reinforcement, which has the gelatin and blood (or blood components) dispersed throughout the wall of the casing and which is both adherent to dry sausage meat emulsion and more easily peeled from moist sausages (e.g. bolognas) and has a color which approximates that of natural gut. This method of application of gelatin (and blood) to regenerated cellulose casings makes possible the preparation of casings having a uniform amount of gelatin (and blood) present therein and avoids the problems which are inherent in the bubble coating method for application of internal coatings to casings. When casings are prepared in this manner, it is generally desirable to cause the gelatin and the protein in the blood to be fixed either by heat or by chemical hardening. The heat encountered in the drying of the casing is generally sufficient to cause the protein to be fixed. However, if desired, the gelatin and blood protein may be fixed by treatment with a hardening agent such as formaldehyde, liquid smoke, or the like, which may be applied as a separate treatment or in admixture with the plasticizer (e.g. glycerol) used for softening and plasticizing the casing.

In carrying out this invention, the color imparted to the casing by the blood may be varied somewhat by varying the concentration of the blood in the viscose solution. Any animal blood containing hemoglobin can be used in this process. While any animal blood can be used, it is preferred to use blood obtained in the slaughtering of animals for food, e.g. hogs, cattle, sheep, goats, etc. The blood may be used as recovered, either with or without addition of preservatives. The blood may be diluted if desired or may be spray dried or otherwise dehydrated to produce a solid product from which the blood may be reconstituted by dilution with water. Where proportions of blood are mentioned hereinafter in the specification or claims it is understood that such proportions are based upon the solid whole blood content or the hemoglobin equivalent content of the mixture containing the blood. Thus, if dried blood is used in the process the proportion is calculated on the weight of the dried blood even though it is reconstituted to initial water content.

When gelatin and blood are mixed with viscose in accordance with this invention and extruded with the viscose into an acid coagulating and regenerating bath the blood and gelatin are dispersed throughout the resulting regenerated cellulose film and produce a casing which has a color substantially the same as natural gut casing and has the desired properties of adhesion toward dried sausage compositions so that the casings will adhere to dry sausage and shrink with it during processing. In carrying out this process the gelatin and blood are added to the viscose just prior to the extrusion dye so that the blood and gelatin are not exposed to concentrated alkali for a sufficient time to result in the chemical degradation of these additives. If the blood and gelatin are left in contact with the viscose for an extended period of time without neutralization they are chemically degraded so that the product which is produced upon extrusion and regeneration is not as effective for use as a dry sausage casing and does not have the desired color. In carrying out this invention the gelatin is mixed with the viscose in an amount ranging from about 0.5–5% based on the weight of the regenerated cellulose product. Blood is added to the viscose in an amount ranging from about 0.1–10% based on the total weight of the regenerated cellulose product including blood solids. When the viscose is extruded into a regeneration and coagulation bath without any reinforcement present the product obtained is a clear regenerated cellulose casing. In such cases the proportions of blood and gelatin are calculated on the regenerated cellulose. When the blood and gelatin treated viscose is used in the preparation of fibrous casing, it is extruded through a die to coat a preformed continuous tube of reinforcing paper (preferably a long fiber hemp paper) and the cellulose impregnated tube is passed into the regenerating and coagulating bath. The proportion of blood and gelatin for such a product is calculated on the total product including regenerated cellulose and reinforcing paper.

The following non-limiting examples are illustrative of the scope of this invention:

Example 1

Beef blood and gelatin were used in the preparation of fibrous casing in accordance with this invention. Gelatin was soaked in water for ½ hour and diluted with hot water to a 3% wt. concentration and cooled. A solution was then prepared consisting of 2 parts by weight of spray-dried beef blood in 18 parts by weight of soft water containing a small proportion (about 0.1–0.5%) of hydrogen peroxide. The solution was mixed at room temperature and strained to remove any undissolved material. Twenty parts by weight of the blood solution and 33 parts by weight of the 3% gelatin solution were mixed with 47 parts by weight of soft water. The resulting solution of gelatin and blood was mixed with viscose and metered into a stream of viscose just prior to the extrusion nozzle. The viscose used had a 7.0% cellulose content and 6.0% alkali content. The blood and gelatin containing solution was fed into the main viscose solution using a metering pump. The final mixture was extruded through an extrusion nozzle and regenerated in a conventional coagulating and regenerating bath (ammonium sulfate and sulfuric acid).

This procedure was used in the extrusion of clear regenerated cellulose films, wherein the blood and gelatin containing viscose was extruded through an annular die into the coagulation and regeneration bath (e.g. ammonium sulfate and sulfuric acid). The procedure was also used in a process for making fibrous casing wherein the viscose was extruded through an annular die to coat and to impregnate a preformed tube of reinforcing paper consisting of a long fiber hemp paper. The impregnated and coated paper was passed into the coagulation and regeneration bath to produce a fibrous reinforced casing containing gelatin and blood dispersed through the walls thereof. The gelatin and blood components in the casing (both in the clear regenerated cellulose casing and the fibrous casing) were effective to produce a color approximating that of natural gut casing and a satisfactory degree of adhesion toward dry sausage meat. In fact, when these casings were used in the processing of dry sausages the casings adhered to the sausage during extended processing and were still adherent to the sausage after shrinkage of the order of 40% had occurred. The blood and gelatin components were not lost during the pre-soaking of the casing in preparation for stuffing with sausage emulsion and generally had properties of the type normally obtained only with natural gut casing.

Example 2

The procedure of Example 1 is modified by use of a chemical hardening agent to fix the gelatin and blood components in the wall of the casing.

A blood and gelatin solution is prepared as described in Example 1 and mixed with viscose just prior to extrusion into a coagulation and regeneration bath. The extruded casing is subsequently washed and plasticized using a solution of glycerol (15% concentration in water) containing 3% formaldehyde. The glycerol softens the regenerated cellulose (or fibrous reinforced regenerated cellulose), and the formaldehyde fixes the proteinaceous components of the blood and the gelatin dispersed in the casing wall. The casing which is prepared in this manner is satisfactory for use in the preparation of various sausages and has a dark ivory color with a slight greenish gray cast which is very similar to natural gut casing. In addition, the casing is very adherent to dry sausage compositions, such as salami and tends to adhere to the meat as it shrinks during curing. It has been found that the color of the casing can be controlled by varying the concentration of blood added with the gelatin.

Example 3

The procedure described in Example 1 is repeated except that fresh whole blood is substituted for reconstituted dried blood. The blood is mixed with a solution of gelatin in substantially the same proportions used in Example 1 and then mixed with the viscose just prior to extrusion. The casing (both clear regenerated cellulose casing and fibrous casing) produced in this manner has the desired color and degree of adhesion toward dry sausage.

In carrying out the improved process of this invention any of a wide variety of hemoglobin containing animal bloods can be used as the coloring ingredient either as blood per se, or blood reconstituted from spray dried blood, or the color forming bodies separated from blood. The blood is preferably used in concentrations ranging from about 0.1–10% based on the weight of the regenerated cellulose product. Gelatin or equivalent proteinaceous material may be used as described above to provide for adhesion of the casing to the sausage which is processed therein. Gelatin or other proteinaceous material is mixed with the viscose along with the blood just prior to extrusion of the viscose into a coagulation and regeneration medium. The gelatin is added to the viscose in an amount ranging from about 0.5 to 5% based on the weight of the regenerated cellulose product. The gelatin and blood may contain a small proportion of hydrogen peroxide to stabilize the color bodies in the blood during processing. As described above, the color which is obtained by incorporation of blood and gelatin into viscose, followed by regeneration of the cellulose and fixing of the proteinaceous components of the blood and gelatin, ranges from very light cream through various shades of ivory. The desirable cream and ivory shades which are obtained at lower blood concentrations appear to result from some chemical interaction between the various components of the blood, gelatin, and viscose. The exact mechanism of color formation is not known, and the particular colors obtained at any given blood concentration must be determined by experimentation, but may be accurately controlled once a given desired color is obtained. Blood plasma or other blood proteins may be used in place of whole blood, together with gelatine to yield a casing which has improved adhesion to dry sausages, and improved peelability from moist sausages.

While this invention has been described fully and completely with special emphasis upon several preferred embodiments of the invention, it is to be understood that within the scope of the appended claims the invention may be practiced otherwise than as specifically described herein.

What is claimed is:
1. In the method of producing tubular sausage casings of regenerated cellulose wherein viscose is extruded through an annular die into a coagulating and regenerating medium, the improvement which comprises,
   preparing a solution of soluble protein in water,
   preparing a solution of whole blood or blood fractions and 0.1–0.5% hydrogen peroxide in water,
   mixing said blood solution and said soluble protein solution together,
   adding the mixture to viscose immediately prior to extrusion thereof, in an amount sufficient to produce a concentration of 0.5–5% protein and 0.1–10% whole blood or blood fractions in the extruded casing to color the casing and provide properties of adhesion toward dry sausage when processed therein.
2. A method in accordance with claim 1 in which the viscose is extruded through an annular die along with a tube of fibrous reinforcing material to produce a fibrous reinforced regenerated cellulose casing.

References Cited

UNITED STATES PATENTS

| | | | |
|---|---|---|---|
| 2,802,745 | 8/1957 | Bosel | 99—176 |
| 3,150,984 | 9/1964 | Broadhead | 99—176 |
| 3,360,383 | 12/1967 | Rose et al. | 99—176 |

HYMAN LORD, *Primary Examiner.*